United States Patent
Czirmer

(10) Patent No.: US 6,205,642 B1
(45) Date of Patent: Mar. 27, 2001

(54) METHOD OF MOUNTING A BODY SIDE MOLDING

(75) Inventor: Carlos N. Czirmer, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/322,491

(22) Filed: May 28, 1999

(51) Int. Cl.[7] .............................. B23P 11/00; B23P 17/00
(52) U.S. Cl. ............................ 29/525.13; 29/525.01; 280/848; 280/849; 280/154; 296/198
(58) Field of Search ........................ 29/525.01, 525.13, 29/897.2; 280/847, 848, 849, 851, 853, 154; 288/159; 296/198

(56) References Cited

U.S. PATENT DOCUMENTS

| | | | |
|---|---|---|---|
| 4,235,466 | * 11/1980 | Mandrik | 293/128 |
| 4,784,430 | * 11/1988 | Biermacher | 296/198 |
| 4,822,656 | 4/1989 | Hutter | 428/41.8 |
| 5,238,268 | * 8/1993 | Logan | 280/848 |
| 5,340,154 | * 8/1994 | Scott | 280/848 |
| 5,353,571 | * 10/1994 | Berdan et al. | 52/16.5 |

* cited by examiner

Primary Examiner—S. Thomas Hughes
Assistant Examiner—Jermie E. Cozart
(74) Attorney, Agent, or Firm—Jeffrey A. Sedlar

(57) ABSTRACT

A method of mounting a wheel flare or other body side molding on a motor vehicle body panel including the steps of forming the wheel flare or other body side molding with a face having a strip of pressure sensitive adhesive tape thereon covered by a protective film, mounting the wheel flare or other body side molding on the body panel for linear translation perpendicular to the body panel, removing the protective film from the pressure sensitive adhesive tape in a gap defined between the body panel and the face in a first position of the wheel flare or other body side molding relative to the body panel, linearly translating the wheel flare or other body side molding perpendicular to the body panel from the first position to a second position in which the face bears against the body panel with the pressure sensitive adhesive tape trapped therebetween and adhesively bonded to each, and rigidly clamping the wheel flare or other body side molding in the second position thereof to the body panel.

3 Claims, 2 Drawing Sheets

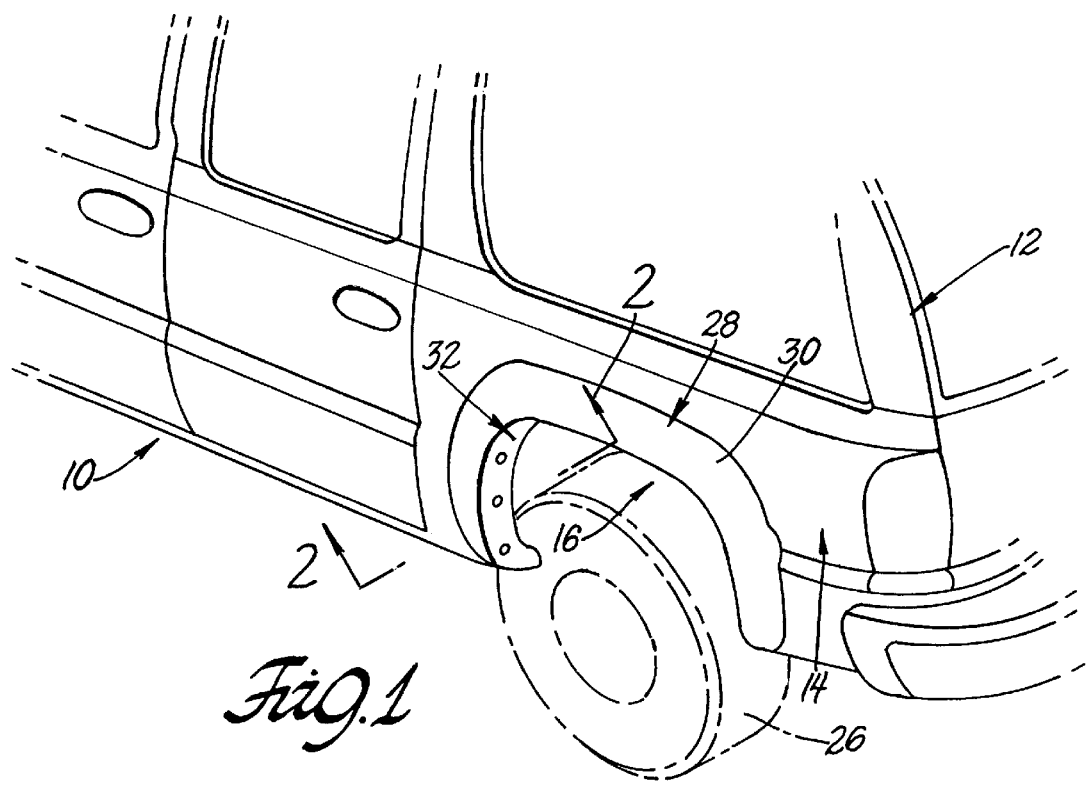
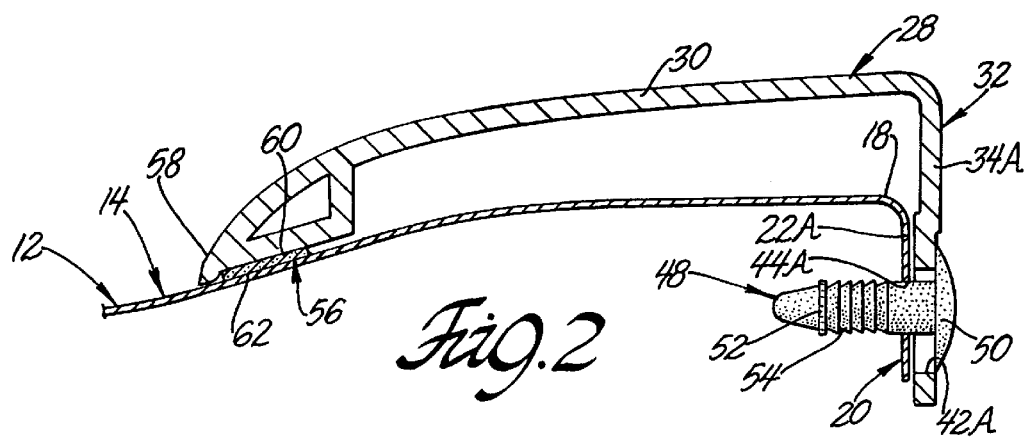
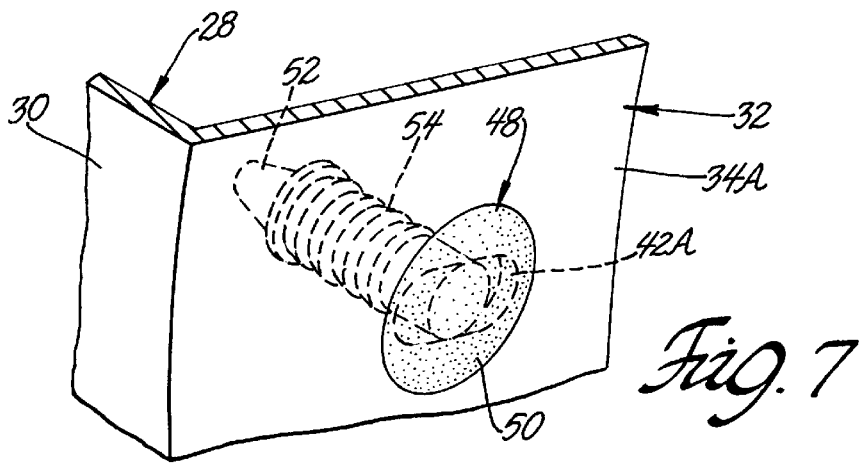

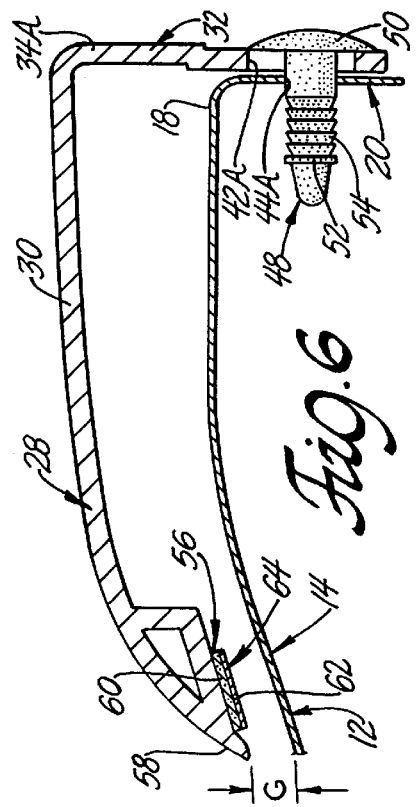
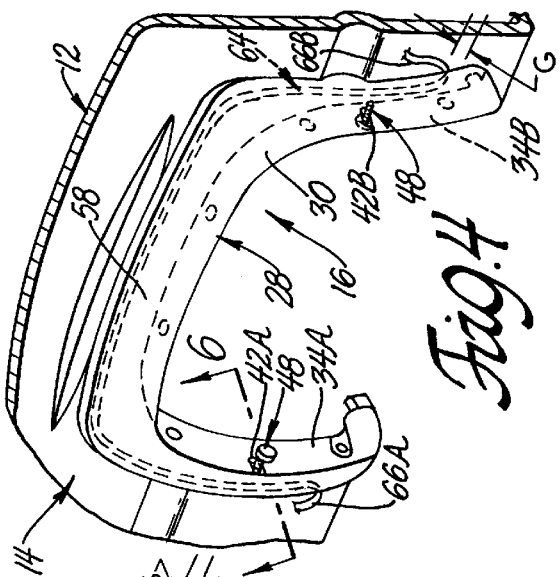
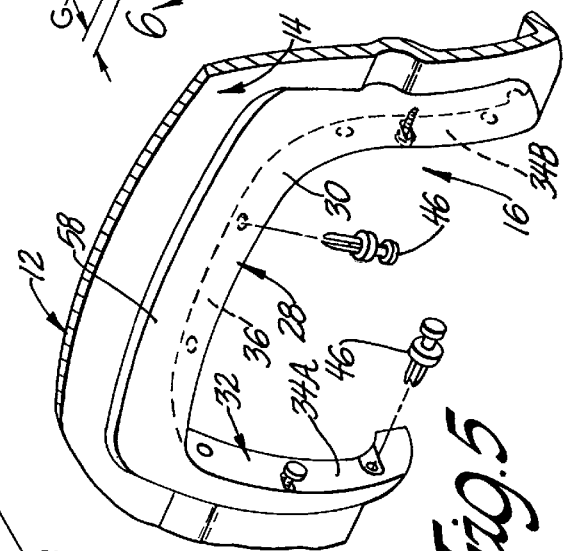
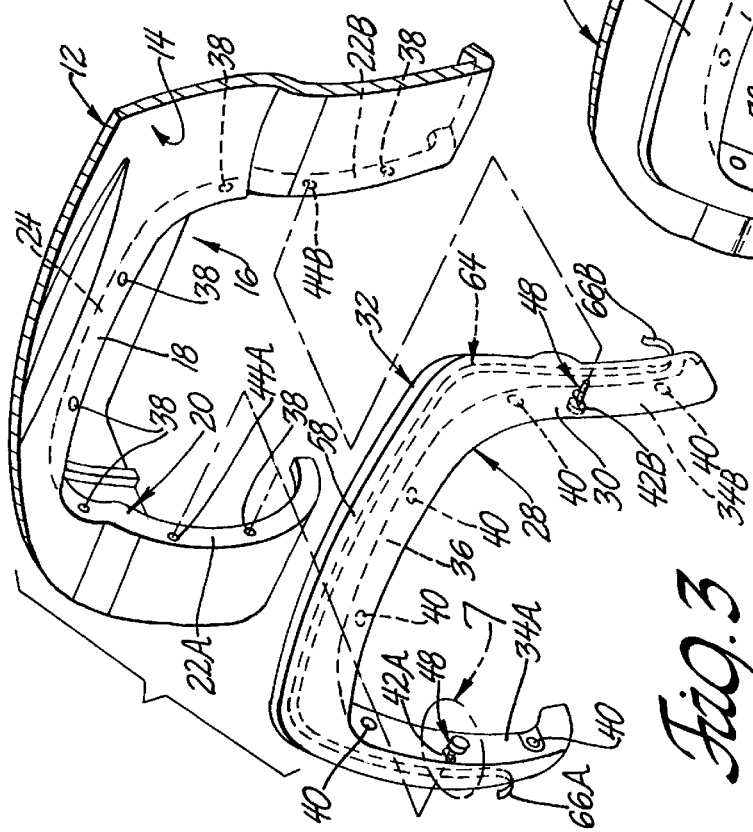

METHOD OF MOUNTING A BODY SIDE MOLDING

TECHNICAL FIELD

This invention relates to a method of mounting a body side molding on a body of a motor vehicle.

BACKGROUND OF THE INVENTION

A motor vehicle body typically includes a plurality of vertical body panels having respective ones of a plurality of inverted U-shaped openings therein referred to as "wheel wells" through which access is had to dirigible road wheels of the motor vehicle. Each vertical panel is usually structurally reinforced around the peripheral edge of the wheel well therein by an integral, inward-turned "mounting flange" perpendicular to the vertical panel.

Commonly, the peripheral edge of the wheel well is shrouded by a body side molding referred to as a "wheel flare" which includes a face generally parallel to the vertical panel and a flange generally perpendicular to the face. An inner surface of the wheel flare face has a strip of pressure sensitive adhesive ("PSA") tape thereon adjacent a peripheral edge of the face. An exposed surface of the PSA tape is covered by a protective film to prevent contamination. The wheel flare flange is clamped to the mounting flange on the vertical panel by a plurality of self-locking fasteners pushed through aligned pairs of apertures in the wheel flare flange and the mounting flange. Concurrently, the protective film is removed from the PSA tape to adhesively bond the peripheral edge of the wheel flare face to the vertical panel. If the protective film is torn during removal from the PSA tape, installation of the wheel flare on the vehicle body is delayed and the expense associated with the installation increased. A method according to this invention of mounting a wheel flare or other body side molding with PSA tape thereon on a panel of a motor vehicle body facilitates removal of the protective film from the PSA tape without tearing and is, therefore, an improvement over heretofore known methods of mounting such wheel flares or other body side moldings.

SUMMARY OF THE INVENTION

This invention is a new and improved method of mounting a wheel flare or other body side molding on a motor vehicle body panel including the steps of forming the wheel flare or other body side molding with a face having a strip of PSA tape thereon covered by a protective film, mounting the wheel flare or other body side molding on the body panel for linear translation perpendicular to the body panel, removing the protective film from the PSA tape in a gap defined between the body panel and the face in a first position of the wheel flare or other body side molding relative to the body panel, linearly translating the wheel flare or other body side molding perpendicular to the body panel from the first position to a second position in which the face bears against the body panel with the PSA tape trapped therebetween and adhesively bonded to each, and rigidly clamping the wheel flare or other body side molding in the second position thereof to the body panel. In a preferred embodiment of the method according to this invention, a pair of barbed fasteners on a mounting flange around a peripheral edge of a wheel well in a vertical panel of a vehicle body cooperate with a pair of lateral slots in a flange of a wheel flare in supporting the wheel flare on the vertical panel for linear translation perpendicular to the vertical panel.

BRIEF DESCRIPTION OF THE DRAWINGS

FIG. 1 is a fragmentary perspective view of a motor vehicle body having a wheel flare mounted thereon by a method according to this invention;

FIG. 2 is an enlarged sectional view taken generally along the plane indicated by lines 2—2 in FIG. 1;

FIG. 3 is an exploded perspective view of a motor vehicle body and a wheel flare illustrating a step in the method according to this invention of mounting a wheel flare on a motor vehicle body;

FIG. 4 is similar to FIG. 3 but illustrating a further step in the method according to this invention of mounting a wheel flare on a motor vehicle body;

FIG. 5 is similar to FIG. 4 but illustrating a still further step in the method according to this invention of mounting a wheel flare on a motor vehicle body;

FIG. 6 is an enlarged sectional view taken generally along the plane indicated by lines 6—6 in FIG. 4; and FIG. 7 is an enlarged view of the portion of FIG. 3 identified by the reference circle 7 in FIG. 3.

DESCRIPTION OF THE PREFERRED EMBODIMENT

Referring to FIGS. 1–3, a fragmentarily illustrated motor vehicle 10 includes a body 12 having a vertical panel 14 defining a side of the body. The vertical panel 14 has an inverted U-shaped wheel well 16 therein. The vertical panel is reinforced around a peripheral edge 18 of the wheel well by an integral, inward-turned mounting flange 20 including a pair of vertical portions 22A,22B on opposite sides of the wheel well and a horizontal portion 24 across the top of the wheel well between the vertical portions. The wheel well 16 affords access to a dirigible wheel 26 of the motor vehicle behind the vertical panel 14.

A body side molding in the form of a plastic wheel flare 28 overlaps the peripheral edge 18 of the wheel well and includes a C-shaped face 30 generally parallel to the vertical panel 14 and a flange 32 generally perpendicular to the face. The wheel flare flange 32 matches the shape of the mounting flange 20 and includes a pair of vertical portions 34A,34B and a horizontal portion 36, FIG. 3, between the vertical portions. The vertical and horizontal portions 22A,22B,24 of the mounting flange are perforated by a plurality of apertures 38, FIG. 3. The vertical and horizontal portions 34A,34B,36 of the wheel flare flange are perforated by a corresponding plurality of apertures 40 aligned with the apertures 38 in the mounting flange. Additionally, the vertical portions 34A, 34B of the wheel flare flange are perforated by respective ones of a pair of lateral slots 42A,42B generally perpendicular to the face 30 and aligned with respective ones of a pair of apertures 44A,44B in the vertical portions 22A,22B of the mounting flange.

The wheel flare 28 is rigidly attached to the vertical panel 14 by a plurality of self-locking fasteners 46, FIG. 5, in respective ones of the aligned pairs of apertures 38,40 which clamp together the wheel flare flange and the mounting flange. The wheel flare 28 is additionally rigidly attached to the vertical panel 14 by a pair of barbed fasteners 48 which protrude through respective ones of the lateral slots 42A, 42B into the apertures 44A,44B in the vertical portions of the mounting flange. Each barbed fastener 48 has a wide head 50 inboard of the wheel flare flange 32 and a shank 52 having a plurality of barbs 54 thereon which prevent dislodgment of the shanks from the apertures 44A,44B without interfering with penetration of the shanks into the apertures. The wheel flare 28 is additionally rigidly attached to the vertical panel 14 by a strip of PSA tape 56 adjacent a peripheral edge 58 of the wheel flare face 30 which is captured between and adhesively bonded to each of the wheel flare face and the vertical panel.

A method according to this invention of mounting the wheel flare 28 on the vehicle body 12 is illustrated in FIGS. 3–7 and includes an initial step of forming the wheel flare with the face 30 and flange 32 as described above and the wheel well 16 with the mounting flange 20 around the peripheral edge 18 thereof. A first side 60 of the strip of PSA tape 56 is adhesively bonded to the wheel flare face 30 adjacent the peripheral edge 58 thereof with a second side 62 of the PSA tape covered by a protective film 64, FIGS. 3,4 and 6, to prevent contamination of adhesive on the second side. Additionally, the shanks 52 of the pair of barbed fasteners 48 are inserted in respective ones of the lateral slots 42A,42B. The barbs 54 on the shanks retain the barbed fasteners in the lateral slots without interfering with relative back and forth linear translation of the barbed fasteners in the lateral slots.

With the second side 62 of the PSA tape 56 covered by the protective film 64 and with the barbed fasteners 48 in the lateral slots 42A,42B, FIG. 3, the wheel flare 28 is advanced into the wheel well 16 until the shanks 52 of the barbed fasteners are aligned with the apertures 44A,44B in the vertical portions of the mounting flange 20. When the shanks of the barbed fasteners are then pushed into the apertures 44A,44B, the lateral slots 42A,42B cooperate with the barbed fasteners in supporting the wheel flare 28 on the vertical panel 14 in vertical alignment with the wheel well 16 and for linear translation perpendicular to the vertical panel.

The outboard ends of the lateral slots 42A,42B cooperate with the shanks 52 of the barbed fasteners therein in defining a first position of the wheel flare 28, FIGS. 4 and 6, relative to the vertical panel 14 in which the wheel flare face 30 is separated from the vertical panel 14 by a gap "G". Importantly, the gap "G" affords clearance for a person installing the wheel flare on the vehicle body to manually grasp respective ones of a pair of end tabs 66A,66B, FIGS. 3–4, of the protective film 64 on the PSA tape and to remove the film from the PSA tape without pinching and tearing the film between the wheel flare and the vertical panel. Additionally, the barbed fasteners react the weight of the wheel flare to the vehicle body and maintain its vertical alignment with the wheel well thereby reducing the manual effort required to install the wheel flare on the vehicle body and, consequently, further reducing the likelihood that the person installing the wheel flare will tear the protective film during its removal from the PSA tape.

After the protective film 64 is removed from the PSA tape, the wheel flare is linearly translated from the first position thereof to a second position, FIGS. 2 and 5, in which the wheel flare face 30 bears against the vertical panel 14 with the PSA tape captured therebetween and adhesively bonded to each. The length of the lateral slots 42A,42B is preferably calculated to create interference between the vertical panel 14 and the wheel flare face 30 in the second position of the wheel flare so that the wheel flare face is resiliently flexed at its junction with the wheel flare flange 32 and thereby biased at its peripheral edge 58 against the vertical panel 14 to maximize the durability of the adhesive bond afforded by the PSA tape.

With the wheel flare 28 in its second position, the apertures 40 in the wheel flare flange are aligned with the apertures 38 in the mounting flange. The self-locking fasteners 46 are then manually pushed into the aligned pairs of apertures 38,40 to rigidly clamp together the wheel flare and the vertical panel. Also, the barbed fasteners 48 are manually pushed further into the apertures 44A,44B in the vertical portions of the mounting flange 20 until the wide heads 50 of the barbed fasteners bear against the wheel flare flange and cooperate with the self-locking fasteners 46 in rigidly clamping together the wheel flare and the vertical panel. The method according to this invention may be practiced as described above for mounting body side moldings other than the wheel flares 28 on the motor vehicle body 12.

What is claimed is:

1. A method of mounting a body side molding on a motor vehicle body panel comprising the steps of:

forming a face on the body side molding, adhesively bonding a first side of a strip of pressure sensitive tape to the face on the body side molding and covering a second side of the strip of pressure sensitive tape with a removable protective film, supporting the body side molding on the motor vehicle body for linear translation perpendicular to the motor vehicle body panel from a first position in which the face of the body side molding is separated from the motor vehicle body panel by a gap, removing the protective film from the second side of the pressure sensitive tape in the gap defined between the face of the body side molding and the motor vehicle body panel in the first position of the body side molding, linearly translating the body side molding perpendicular to the motor vehicle body panel from the first position thereof to a second position in which the face of the body side molding bears against the motor vehicle body panel with the strip of pressure sensitive tape trapped therebetween and adhesively bonded to each of the face of the body side molding and the motor vehicle body panel, and rigidly clamping the body side molding in the second position thereof to the motor vehicle body panel, wherein the body side molding is a wheel flare having a face generally parallel to a vertical panel of the motor vehicle body and overlapping a peripheral edge of an inverted U-shaped wheel well in the vertical panel, wherein the step of supporting the wheel flare on the motor vehicle body for linear translation perpendicular to the vertical panel of the motor vehicle body comprises the steps of:

forming an inverted U-shaped mounting flange on the vertical panel of the motor vehicle body around a peripheral edge of the wheel well therein generally perpendicular to the vertical panel, forming an inverted U-shaped flange on the wheel flare generally perpendicular to the face of the wheel flare matching the inverted U-shape of the mounting flange on the vertical panel of the motor vehicle body, forming a pair of elongated slots in opposite sides of the inverted U-shaped flange on the wheel flare generally perpendicular to the vertical panel of the motor vehicle body, and attaching respective ones of a pair of fasteners to opposite sides of the inverted U-shaped mounting flange on the vertical panel of the motor vehicle body through corresponding ones of the pair of elongated slots in opposite sides of the inverted U-shaped flange on the wheel flare so that the elongated slots and the fasteners cooperate in supporting the wheel flare on the vertical panel for linear translation perpendicular to the vertical panel.

2. The method of mounting a body side molding on a motor vehicle body panel recited in claim 1 wherein the step of attaching respective ones of a pair of fasteners to opposite sides of the inverted U-shaped mounting flange on the vertical panel of the motor vehicle body through corresponding ones of the pair of elongated slots in opposite sides of the inverted U-shaped flange on the wheel flare comprises the steps of:

forming a plurality of barbs on a shank of each of the pair of fasteners, and pushing the shank of each of the pair of fasteners through a corresponding one of the elongated slots in opposite sides of the inverted U-shaped flange on the wheel flare into respective ones of a pair of apertures in opposite sides of the inverted U-shaped mounting flange on the vertical panel of the motor vehicle body with the barbs cooperating with the apertures in preventing dislodgment of the fasteners from the inverted U-shaped mounting flange.

3. The method of mounting a body side molding on a motor vehicle body panel recited in claim 2 wherein the step of rigidly clamping the wheel flare in the second position thereof to the vertical panel of the motor vehicle body comprises the steps of:

forming a plurality of apertures in the flange on the wheel flare, forming a corresponding plurality of apertures in the mounting flange on the vertical panel of the motor vehicle body which cooperate in the second position of the wheel flare with the apertures in the flange on the wheel flare in defining a plurality of registered pairs of apertures, and inserting a plurality of self-locking fasteners in respective ones of the registered pairs of apertures in the flange on the wheel flare and the mounting flange on the vertical panel to rigidly clamp together the flange on the flare and the mounting flange.

* * * * *